(12) United States Patent
Sato

(10) Patent No.: US 7,587,476 B2
(45) Date of Patent: Sep. 8, 2009

(54) PERIPHERAL DEVICE WITH A CENTRALIZED MANAGEMENT SERVER, AND SYSTEM, COMPUTER PROGRAM PRODUCT AND METHOD FOR MANAGING PERIPHERAL DEVICES CONNECTED TO A NETWORK

(75) Inventor: Tomotoshi Sato, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 576 days.

(21) Appl. No.: 09/922,837

(22) Filed: Aug. 7, 2001

(65) Prior Publication Data

US 2003/0033395 A1 Feb. 13, 2003

(51) Int. Cl.
*G06F 15/173* (2006.01)

(52) U.S. Cl. .............. 709/223; 709/220; 709/245; 709/230; 709/204; 709/208

(58) Field of Classification Search ......... 709/204, 709/205, 223–226, 201–203, 220, 245, 208; 702/190; 707/100; 717/120; 358/1.14; 714/4; 710/15–19, 62–74

See application file for complete search history.

(56) References Cited

U.S. PATENT DOCUMENTS

| | | | | |
|---|---|---|---|---|
| 5,237,693 | A * | 8/1993 | Kiyohara et al. | 709/229 |
| 6,308,205 | B1 * | 10/2001 | Carcerano et al. | 709/221 |
| 6,381,635 | B1 * | 4/2002 | Hoyer et al. | 709/207 |
| 6,614,811 | B1 * | 9/2003 | Alaimo et al. | 370/498 |
| 6,633,835 | B1 * | 10/2003 | Moran et al. | 702/190 |
| 6,633,878 | B1 * | 10/2003 | Underwood | 707/100 |
| 6,636,983 | B1 * | 10/2003 | Levi | 714/4 |
| 6,662,357 | B1 * | 12/2003 | Bowman-Amuah | 717/120 |
| 6,701,345 | B1 * | 3/2004 | Carley et al. | 709/205 |
| 6,745,240 | B1 * | 6/2004 | Denman et al. | 709/220 |
| 6,760,748 | B1 * | 7/2004 | Hakim | 709/204 |
| 6,917,626 | B1 * | 7/2005 | Duvvury | 370/466 |
| 6,981,025 | B1 * | 12/2005 | Frazier et al. | 709/209 |
| 7,027,169 | B1 * | 4/2006 | Morikawa et al. | 358/1.14 |
| 2001/0029530 | A1 * | 10/2001 | Naito et al. | 709/223 |
| 2002/0054316 | A1 * | 5/2002 | Abe | 358/1.14 |
| 2005/0251569 | A1 * | 11/2005 | Nishio | 709/223 |

FOREIGN PATENT DOCUMENTS

| | | |
|---|---|---|
| JP | 04-318617 | 11/1992 |
| JP | 06-350786 | 12/1994 |
| JP | 8-305516 | 11/1996 |
| JP | 11-275106 | 10/1999 |

(Continued)

OTHER PUBLICATIONS

Jim Waldo, "Jini Architecture for Network-centric Computing", 1999, Communications of the ACM, vol. 42, No. 7 (1999), pp. 76-82.*

*Primary Examiner*—Kenny S Lin
*Assistant Examiner*—Lan-Dai T Truong
(74) *Attorney, Agent, or Firm*—Oblon, Spivak, McClelland, Maier & Neustadt, P.C.

(57) ABSTRACT

Peripheral devices connected to a network each include a device management controller capable of deciding which peripheral device is to perform the managing function for all peripheral devices. The selected peripheral device has a device management server that can be enabled to function as a centralized management server. The default URLs of the web servers for the non-selected peripheral devices are set to correspond to the web server for the selected peripheral device. A user accessing any of the peripheral devices is thus routed to the centralized managing device. The peripheral devices can be printers forming a distributed printing system managed by one printer. A system, a method and a computer program product for managing peripheral devices on a network are also disclosed.

23 Claims, 6 Drawing Sheets

FOREIGN PATENT DOCUMENTS

| | | |
|---|---|---|
| JP | 2000-20262 | 1/2000 |
| JP | 2000-151892 | 5/2000 |
| JP | 2000-293337 | 10/2000 |
| JP | 2000-326597 | 11/2000 |

\* cited by examiner

| PERIPHERAL DEVICE | CPU PERFORMANCE |
| --- | --- |
| 50 | 100 |
| 60 | 200 |
| 70 | 150 |

FIG. 4

PERIPHERAL DEVICE WITH A CENTRALIZED MANAGEMENT SERVER, AND SYSTEM, COMPUTER PROGRAM PRODUCT AND METHOD FOR MANAGING PERIPHERAL DEVICES CONNECTED TO A NETWORK

BACKGROUND OF THE INVENTION

1. Field of the Invention

The present invention is directed to a peripheral device with a centralized management server, and to a system, a computer program product and a method for managing peripheral devices connected to a network.

2. Discussion of the Background

Today's world of information technology relies on an increasingly complex inter-relationship between computers, communication networks, printers, scanners, fax machines, copy machines, pagers, cell phones, and other devices. This complexity strains the ability of the users to manage the different components of the systems. For example, the user of a printing system including several printers connected via a network faces the burden of managing each printer.

FIG. 1 shows a conventional printing system, which includes several printers or multi-function peripherals (MFP) 10-30 connected to a communication network 90, to which is connected a user station 40. The printing system of FIG. 1 can be used, for example, as a distributed printing system, wherein a user with a large printing job saves time by parallel printing on several different printers. Alternatively, a user may want to print different portions of the job to printers located at different sites, or can select printers with different characteristics (e.g., color, high speed, stapling, punching, and book finishing capabilities) based on what the user wants to do.

More generally, devices 10-30 can be peripheral devices, such as printers, digital copiers, fax machines, copy machines, or combinations thereof. The communication network 90 is for example the Internet or an intranet. The user station 40 can be a personal computer (PC) or a workstation (WS), which permits a user to connect to the network 90 (for example via a network interface card) and access the peripheral devices 10-30 (for example via a Web browser).

In the conventional printing system of FIG. 1, each of the peripheral devices 10-30 includes a local management device (not shown) that performs management functions for that device. The user station 40 accesses the management functions of each device through the network 90. The user must, however, access, manage and maintain each peripheral device 10-30 independently via the devices' individual network addresses. The dotted lines in FIG. 1 illustrate these independent management accesses between each of the peripheral devices 10-30 and the user station 40. This conventional approach is rather inefficient from the point of view of the user station 40.

A proposed solution is to dedicate a server on the network to perform the management function for the user. This proposal, however, requires adding a dedicated server on the network, which is cumbersome and costly. Furthermore, if the dedicated server breaks down, the peripheral devices cannot be properly managed.

SUMMARY OF THE INVENTION

Accordingly, one object of the present invention is to provide a peripheral device with a centralized management server configured to manage several peripheral devices connected to a network.

Another object of the present invention is to provide a system including several peripheral devices managed by a centralized management server located in one of the peripheral devices.

Yet another object of the present invention is to provide a computer program product configured to manage, from a peripheral device, several peripheral devices connected to a network.

Another object of the present invention is to provide a method of managing, from a peripheral device, several peripheral devices connected to a network.

To achieve these and other objects, the present invention provides several peripheral devices connected to a network. Each of the peripheral devices can include a device management controller to decide which peripheral device is to perform the managing function for all peripheral devices. The selected peripheral device has a device management server that performs the functions of a centralized management server. The non-selected peripheral devices have a web server that directs a user to the web server of the selected peripheral device. Accordingly, a single peripheral device centrally manages several peripheral devices connected to the network. The user of the system need only know a single network address corresponding to any one of the web servers of the devices on the network. Form the point of view of the user, the system according to the present invention is simplified and more efficient compared to the conventional system shown in FIG. 1. In addition, if the managing device breaks down, another peripheral device on the network can take over the central managing functions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 is a comparison table used to select a centralized management device according to the present invention;

DESCRIPTION OF THE PREFERRED EMBODIMENTS

Figure 2:
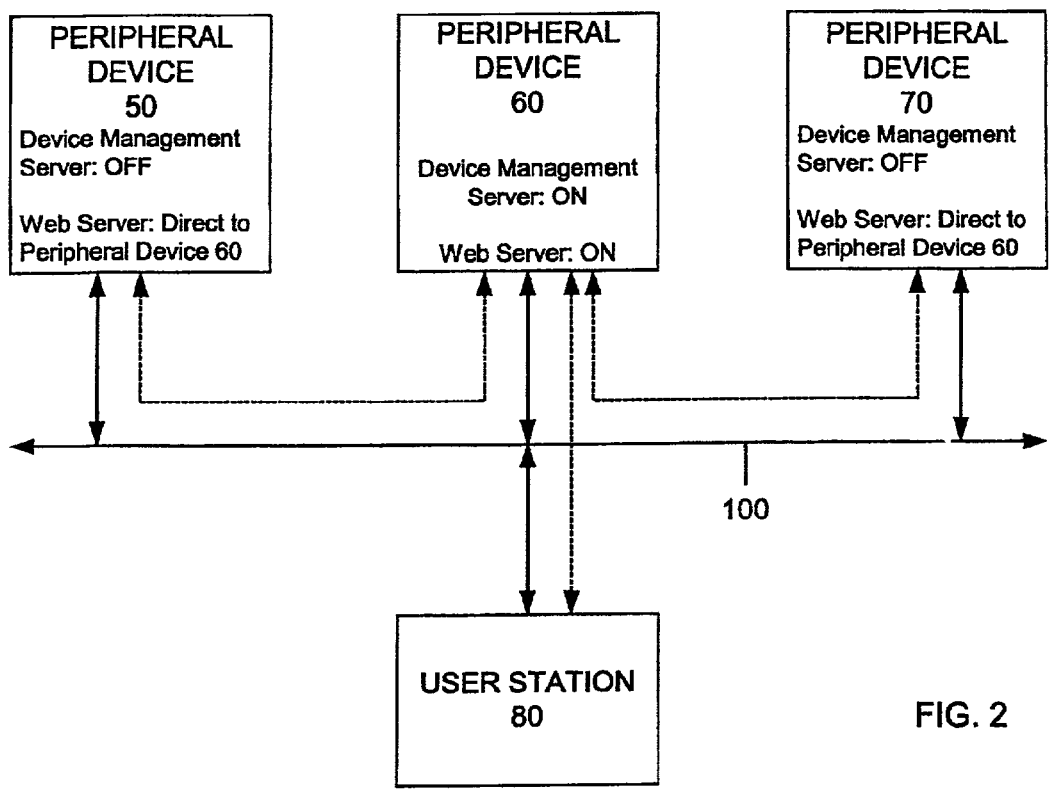
FIG. 2 is a block diagram showing a system according to the present invention.

Referring now to the drawings, wherein like reference numerals designate identical or corresponding parts throughout the several views, FIG. 2 is a block diagram of a system according to the present invention. The system includes several peripheral devices 50-70 connected to a network 100, to which is connected a user station 80.

The system of FIG. 2 can be, for example, a distributed printing system wherein the peripheral devices 50-70 are printers and/or MFPs. In general, the peripheral devices 50-70 include, but are not limited to, printers, MFPs, digital copiers, fax machines, copy machines, or combinations thereof.

The communication network 100 is preferably the Internet or an intranet, but can also be a local area network, a wide area network, or any type of network such as an extranet used to provide controlled access to external users, for example through the Internet. Other communication links for the network 100, such as a virtual private network, or a wireless link, may be used as well.

The user station 80 can be a personal computer (PC) or a workstation (WS), which permits a user to connect to the network 100 (for example via a network interface card) and access the peripheral devices 50-70 (for example via a Web browser).

Figure 3:
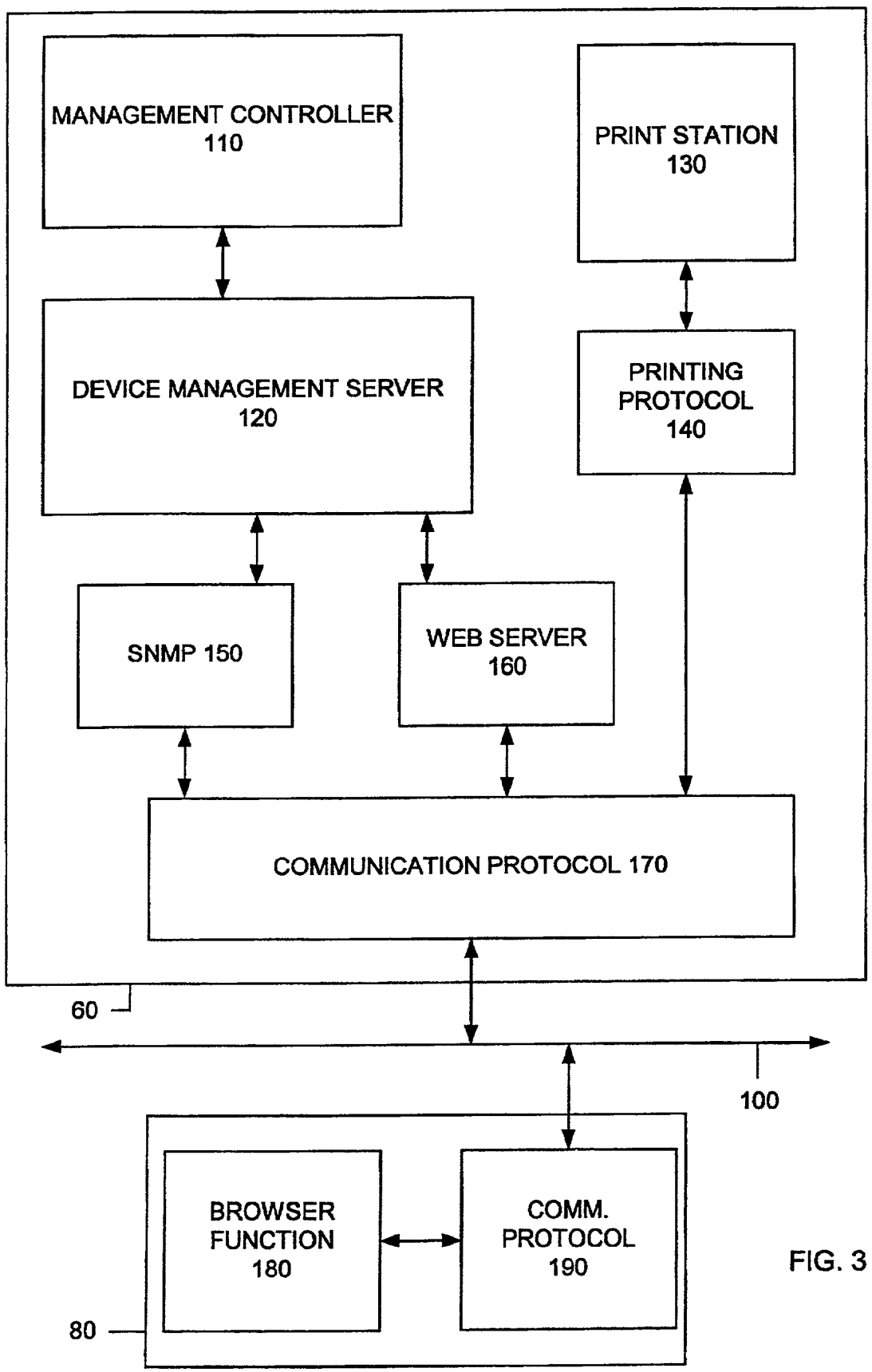
FIG. 3 is a block diagram illustrating functional components of a peripheral device and a user station according to the present invention.

Turning now to FIG. 3, this block diagram illustrates the functional components of the peripheral device 60 and the user station 80 according to the present invention. It is to be understood that the functional components, and their organization, shown in FIG. 3 are only illustrative and should not be considered as limiting the present invention. Furthermore, while peripheral device 60 is shown, the other devices 50 and 70 may have similar functional components.

As shown in FIG. 3, each of the peripheral devices 50-70 can include a management controller 110 configured to decide which peripheral device on the network is to perform the managing function for the peripheral devices 50-70. For example, each management controller 110 can compare a characteristic for each of the peripheral devices 50-70, and based on this comparison, can decide whether or not its corresponding device should be the centralized managing device. The management controllers 110 can thus select based on such comparison one of the peripheral devices 50-70 as the centralized managing device. The management controllers 110 can select the centralized managing device based on a variety of criteria, such as CPU performance, memory size, average load, etc. For example, based on the data listed in FIG. 4, the management controllers 110 would select the peripheral device 60 because it has the highest CPU performance out of the three peripheral devices connected to the network 100 The user can also exclude certain peripheral devices from being selected as the centralized managing device. For example, the user can set the variable used as the selection criteria to a lower value for a particular peripheral device, so as to avoid selection of that device.

Each of the peripheral devices 50-70 includes a device management server 120 that can be the centralized management server for the system in the event that the management controllers 110 select that device as the centralized managing device. As an example, in FIG. 2, the selected peripheral device performing the centralized management function for the system is the peripheral device 60. Accordingly, the management controller 110 of peripheral device 60 enables (turns ON) the device management server 120 of peripheral device 60. The management controller of any previous centralized managing device can then disable its own device management server. The management controller of all non-selected devices (including the previous centralized managing device) can set their respective default URLs (universal resource locators) of their respective web servers (discussed next) to correspond to the web server 160 of the selected peripheral device (device 60 in FIG. 2). For example, the default URLs of the web servers for the non-selected peripheral devices can be set to be the default URL of the web server of the selected peripheral device.

The peripheral devices 50-70 also include a web server 160. The web server 160 of the peripheral device selected to be the centralized managing device provides the information gathered by the device management server 120 about the system's peripheral devices 50-70 to the user station 80. In other words, the web server 160 is used to control and display the device management server function through the web browser of the user station 80. As explained above, the web servers 160 of the non-selected peripheral devices direct the user station 80 to the web server of the selected peripheral device. Web servers are well-known in the art and one non-limiting type of web server is discussed for example, in part 28 of "How The Internet Works", by Preston Gralla, Que Corporation, August 1999, ISBN: 0-7897-2132-5, the entire content of this book being hereby incorporated by reference. The term "web server" is used in this document to describe generally an application server configured to exchange information from the device management server 120 to the user station 80 via a network. While the network 100 is intended to be the Internet for a preferred embodiment of the present invention, the term "web server" is not intended to limit the server to an Internet-type server nor to limit the network 100 to the Internet. Similarly, the network identifiers for the data provided by the web servers for devices 50-70 are generally referred to as "URLs." However, this nomenclature is not intended to limit the identifiers to Internet-type identifiers nor to limit the network 100 to the Internet.

Figure 1:
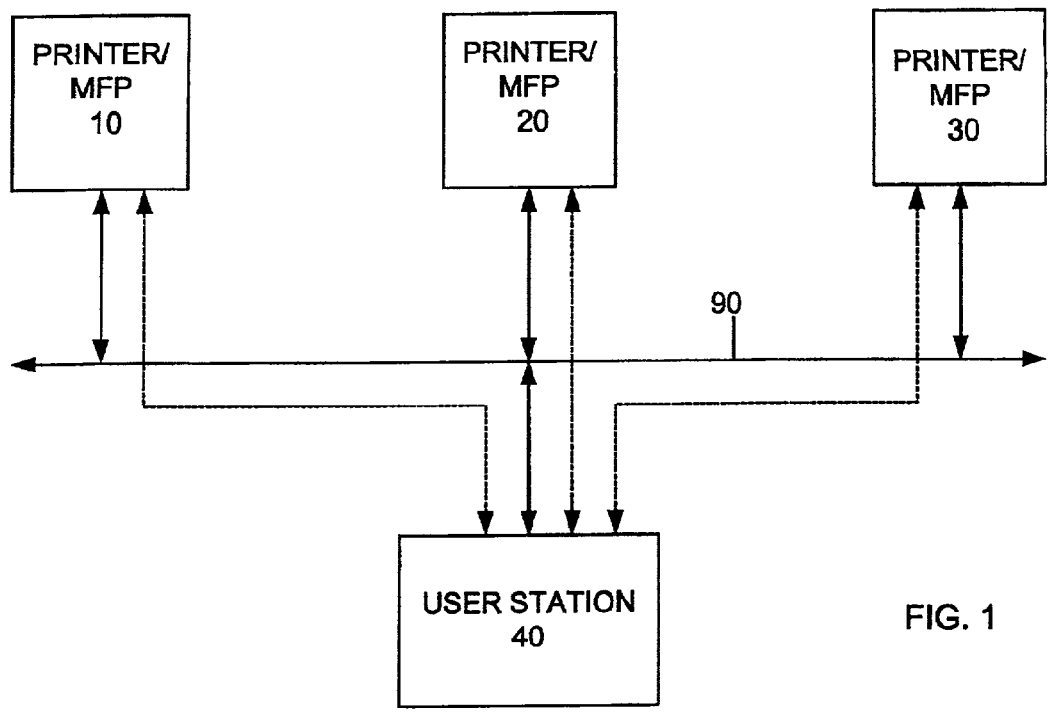
FIG. 1 is a block diagram showing a conventional printing system.

In the non-selected peripheral devices (devices 50 and 70 in FIG. 2), the management controllers 110 disable (turn OFF) their respective device management servers 120. In these non-selected peripheral devices 50 and 70, the management controllers 110 set the default URL of their respective web servers to correspond to the web server of the selected peripheral device 60. Accordingly, a user attempting to access the non-selected devices 50 and 70 is directed to the centralized management device 60. In other words, the user of the system need only know the address of the web server for any single device on the network and need only access a single web server. No matter which peripheral device the user tries to access, the user is routed to the selected centralized management device so that the user can receive data from (e.g., status, error messages, etc.), and/or send requests or data to, the centralized management device. The user can thus access and/or manage the peripheral devices on the network through the centralized management device. The dotted lines in FIG. 2 illustrate how the user station 80 can access the system's peripheral devices 50-70 by accessing a single device (device 60 in FIG. 2). From the point of view of the user, the system according to the present invention is simplified and more efficient compared to the convention system shown in FIG. 1.

As mentioned above, if the peripheral device 60 is selected as the managing device (the case shown in FIG. 2), the device management server 120 manages the system's peripheral devices 50-70. As the centralized management device, the device management server 120 can, for example, search for all connected peripheral devices, poll the status of these devices jam status, out-of-paper errors, etc.), set their respective configurations, provide information to the user station 80, and perform commands issued by the user station 80. In general, the device management server 120 can receive instructions from the user station 80, request and receive information from the peripheral devices connected to the network 100, set configurations for the peripheral devices, and send information to the user station 80. In a preferred embodiment, the device management server 120 manages, and interacts with, the system's peripheral devices 50-70 through a network management protocol, as described next.

The peripheral devices 50-70 can also include a network management protocol 150, such as the Simple Network Management Protocol or "SNMP." The SNMP permits the device management server 120 to communicate with the management information base (MIB) (not shown) of the peripheral device 60 and with the MIBs of the other peripheral devices 50 and 70 connected to the network 100. For example, the device management server 120 can request and receive, using the SNMP, status and configuration information from the other peripheral devices. The SNMP is well-known in the art and is described in chapter 25 of "TCP/IP Illustrated, Volume 1," by Richard Stevens, Addison-Wesley (1994), the entire content of this book being hereby incorporated by reference.

If the peripheral devices 50-70 are printers, the devices include a printing protocol 140, such as LPR, IPP, port 9100 printing, and a printing station 130. The printing station 130 is implemented by a print engine and controller configured to generate a printout, as is well-known in the art. The printing protocol 140 allows the print station 130 to print data received form the remote user station 80. Printing protocols are well-known in the art. If the peripheral devices 50-70 perform other functions than printing, the devices can include other types of protocols to perform such functions in accordance with commands and data received from the user station 80.

The peripheral devices 50-70 also include a communication protocol 170, such as the Transmission Control Protocol/Internet Protocol "TCP/IP." TCP/IP 170 permits the exchange of information between the network 100 and the functional components of the peripheral devices 50-70. TCP/IP protocols are well-known in the art and described in "TCP/IP Illustrated, Volume 1," by Richard Stevens, Addison-Wesley (1994), the entire content of this book being hereby incorporated by reference.

FIG. 3 also shows the functional components of the user station 80, which includes a communication protocol 190, such as TCP/IP that enables basic communication with the network 100. The user station 80 also includes a browser function 180. The browser function 180 permits a user to browse through the network for information about the system's peripheral devices 50-70. The browser function 180 can be implemented by a web browser tool including, but not limited to INTERNET EXPLORER, available from Microsoft Corporation and NETSCAPE NAVIGATOR, available from Netscape Communications Corporation.

The device management server 120 can thus obtain information related to all the system's peripheral devices 50-70 using SNMP 150 and TCP/IP 170, transmit that information using the web server 160 via TCP/IP 170 to the user station 80. In turn, the user at the user station 80 can configure and change the settings of any peripheral device using its browser function 180 and TCP/IP 190.

Figure 5:
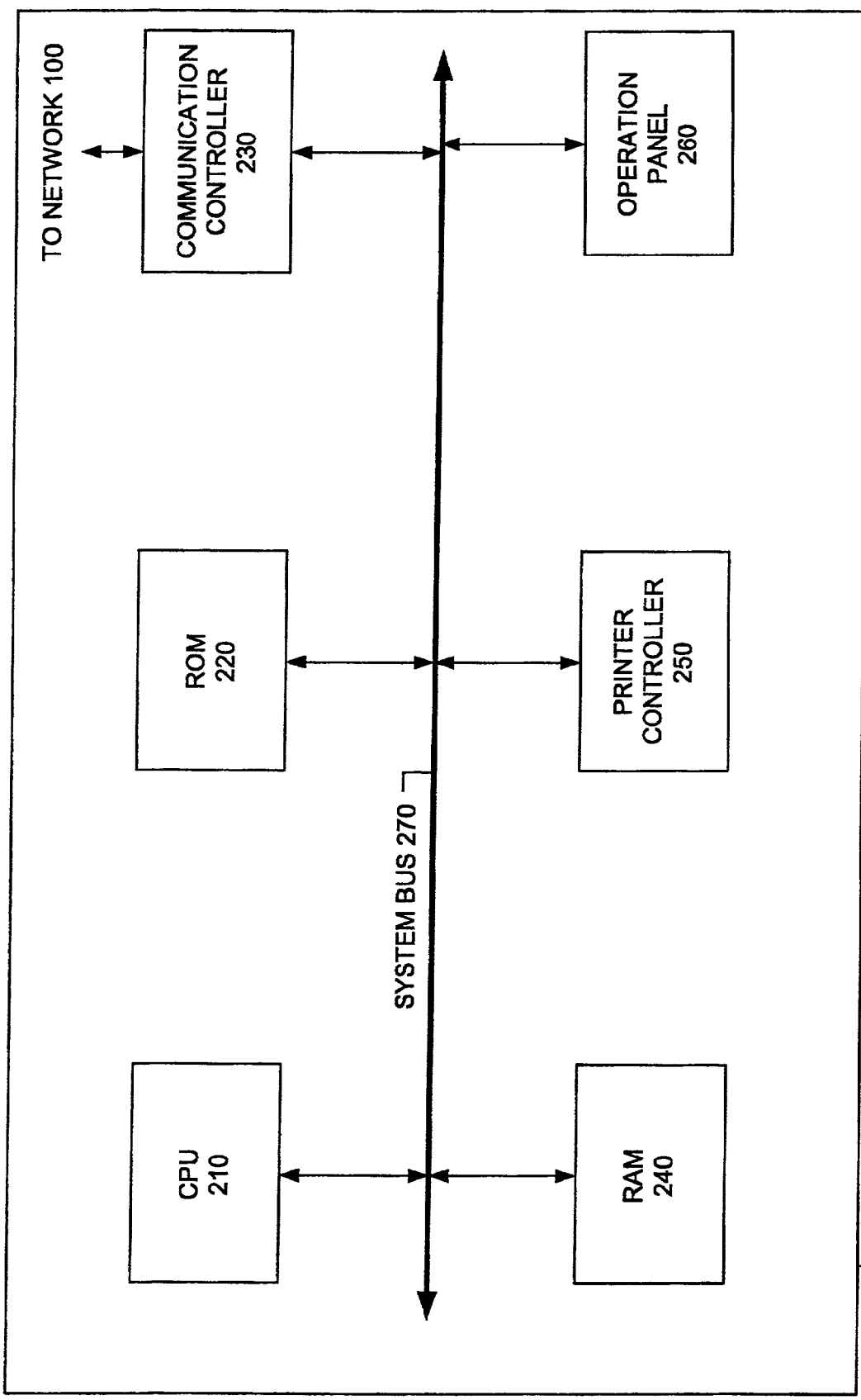
FIG. 5 is a block diagram showing the hardware components of a peripheral device according to the present invention.

FIG. 5 illustrates the hardware components that implement the functional components of the peripheral devices 50-70. A central processing unit 210 ("CPU") performs a number of the management controller and management server functions. The CPU 210 communicates with a number of other devices by way of a system bus 270.

A read only memory 220 ("ROM") connects to the system bus 270 for use by the CPU 210. The ROM 220 includes computer readable instructions that, when executed by the CPU 210, perform the different functions discussed above associated with managing and printing. The ROM 220 can be in a semiconductor, optical, or other forms capable of hosting application software and temporary results.

A communication controller 230 connected to the system bus 270 provides a connection to the network 100 and permits the peripheral devices 50-70 to communicate with each other and other devices. Various types of communication controller 230 are well-known in the art and can be used for the present invention. In a preferred embodiment, the communication controller 230 includes a network interface card ("NIC"), such as an Ethernet card.

A random access memory 240 ("RAM") connected to the system bus 270 hosts temporary storage values used in implementing the functions of the peripheral devices 50-70, such as the managing and printing functions.

A printer controller 250 connected to the system bus 270 controls the printer engine and related peripherals such as duplex unit and finisher in order to produce a printout.

An operation panel 260 connected to the system bus 270 provides an input/output capability. For example, the operation panel 260 can include a keyboard or key pad to input information and a display device to display information. A variety of display devices may be used such as a liquid crystal display ("LCD").

Figure 6A:
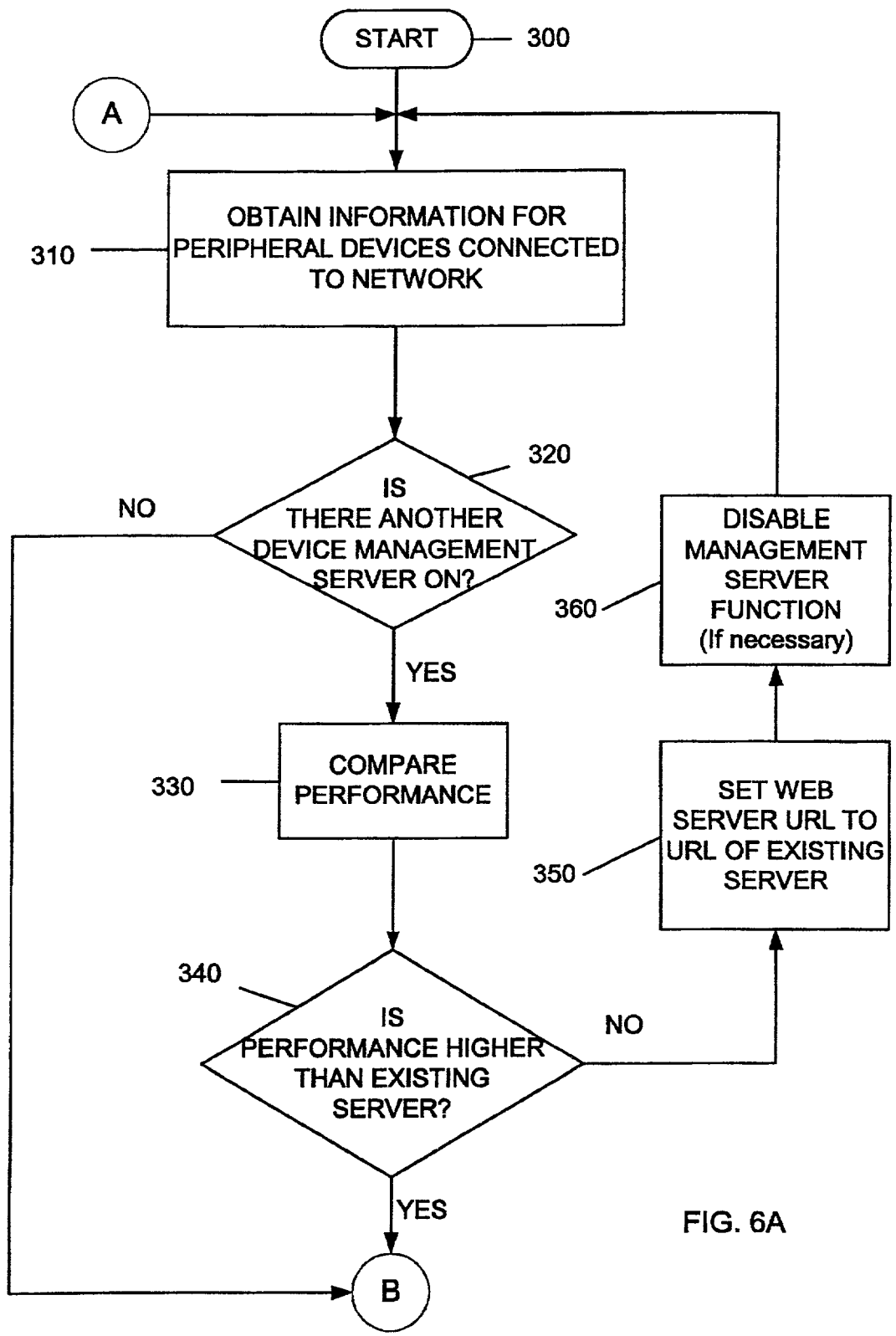
FIGS. 6A-B show a flow chart of a method of managing peripheral devices according to the present invention.
Figure 6B:
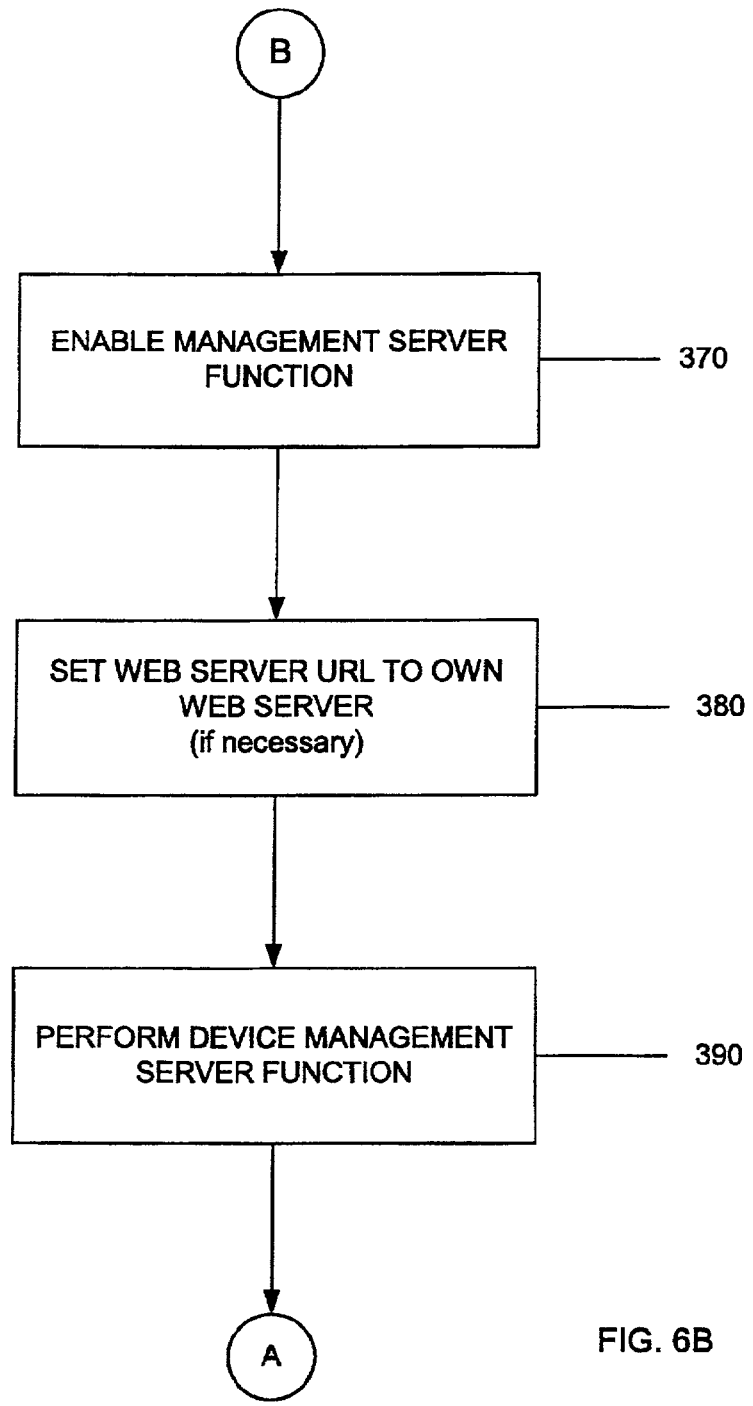

FIGS. 6A-B show a flowchart illustrating a method of managing several peripheral devices on a network, according to the present invention. This method can be implemented by the above-described management controller 110 and the device management server 120 of peripheral devices 50-70. In the following description, the method is described in terms of the functions performed by one of the peripheral devices (hereafter "the device"), which can be any one of the devices 50-70.

After booting up at step 300, the device obtains information for other peripheral devices connected to the network at step 310. For example, the device can use SNMP 150 commands to request comparison data such as the CPU performance of the system's devices. At step 320, the device inquires as to whether there is another enabled device manager server (such as device manager server 120) providing management functions for the devices connected to the network. If there is no enabled server, the process proceeds to step 370 where the device's management server function is enabled, as described further below.

If there is an enabled device manager server (hereafter the "already enabled server"), the device compares the performance of that server with its own characteristics at step 330. For example, the device can use the CPU performance data shown in FIG. 4. At step 340, the device decides which device has the higher performance. If the device's performance is lower than the already enabled server, the device sets the default URL for its web server to correspond to the default URL of the web server of the already enabled server at step 350. If the device's management server function is enabled, the device disables its management server function at step 360. If the device's management server function is not enabled, the device keeps it disabled. The process can then loop back to step 310 and repeat the loop, for example, until the already enabled server is disabled, breaks down or until the value of the comparison data for the already enabled server drops below that of the device.

If the device's performance is higher than the already enabled server, the device enables its device management server at step 370. If the device's web server URL is set to another device's URL, the device sets its web server URL back to its own web server at step 380. If the device's web server URL is already set to its own web server, the device keeps that setting. Once enabled, the device management server performs the centralized management server function for the devices connected to the network at step 390.

If a new device is added to the network, by checking at step 320 whether another device has an enabled device management function, the device effectively checks whether the new device has its device management function enabled. If no new device is added or if the new device does not have an enabled device management function, the device continues to perform the centralized management server function. If there is a new device with an enabled device management function, the device can follow steps 330-390, as described above.

The mechanisms and processes set forth in the present description may be implemented using a conventional general purpose microprocessor(s) programmed according to the teachings of the present specification, as will be appreciated to those skilled in the relevant arts. Appropriate software coding can readily be prepared by skilled programmers based on the teachings of the present disclosure, as will also be apparent to those skilled in the relevant arts. In particular, the computer program product for managing peripheral devices on a network according to the present invention can be written in a number of computer languages including but not limited to C, C++, Fortran, and Basic, as would be recognized by those of ordinary skill in the art. The invention may also be implemented by the preparation of applications specific integrated circuits or by interconnecting an appropriate network of conventional component circuits, as will be readily apparent to those skilled in the art.

The present invention thus also includes a computer-based product that may be hosted on a storage medium and include instructions that can be used to program a computer to perform a method in accordance with the present invention. This storage medium can include, but is not limited to, any type of disk including floppy disks, optical disks, CD-ROM, magneto-optical disks, ROMs, RAMs, EPROMs, EEPROMs, Flash Memory, Magnetic or Optical Cards, or any type of media suitable for storing electronic instructions.

Obviously, numerous additional modifications and variations of the present invention are possible in light of the above teachings. It is therefore to be understood that within the scope of the appended claims the present invention may be practiced otherwise than as specifically described herein.

What is claimed as new and desired to be secured by Letters Patent of the United States is:

1. An image printing device configured to be connected to a plurality of other image printing devices via a network, said image printing device comprising:
    a web server which can be a centralized management server for the network in an event that the image printing device is selected as a centralized management device;
    a management unit configured to manage the plurality of other image printing devices and said image printing device;
    a comparing unit configured to compare characteristics for each of the plurality of other image printing devices and said image printing device;
    a selection unit, provided in said image printing device, configured to select a managing image printing device to manage the plurality of other image printing devices and said image printing device based on a result of a comparison between the characteristics for each of the plurality of other image printing devices and said image printing device, wherein said characteristics include one or more of central processing unit performance, memory size, or average load, wherein the managing image printing device is selected by said selection unit out of a group including the plurality of other image printing devices and said image printing device;
    a setting unit configured to set a default URL for said web server to correspond to the web server of the managing image printing device selected by the selection unit, wherein default URLs of web servers in the plurality of other image printing devices are also set to correspond to the web server of the managing image printing device a checking unit configured to check if another image printing device is managing the plurality of other image printing devices and said image printing device; and
    a disabling unit configured to disable the management unit when the another image printing device is managing the plurality of other image printing devices and said image printing device.

2. The image printing device of claim 1, further comprising:
    an enabling unit configured to enable said management unit when the managing image printing device selected by said selection unit is said image printing device.

3. The image printing device of claim 1, wherein said management unit comprises:
    a receiving unit configured to receive instructions from a user station connected to the network;
    a requesting unit configured to request and receive information from the plurality of other image printing devices;
    a configuration setting unit configured to set configurations for the plurality of other image printing devices; and
    a transmitting unit configured to transmit information to the user station.

4. The image printing device of claim 1, wherein said image printing device is a printer, a multi-function peripheral, a digital copier, a fax machine, a copy machine, or a combination thereof.

5. The image printing device of claim 1, further comprising:
    a network interface configured to communicate with the network, wherein a communication request to a non-selected image printing device that is not the managing image printing device is routed by a web server in the non-selected image printing device to the managing image printing device.

6. A system comprising:
    a plurality of image printing devices connected to a network, wherein each image printing device of said plurality of image printing devices comprises:
    a web server which can be a centralized management server for the network in an event that the image printing device is selected as a centralized management device;
    a management unit configured to manage said plurality of image printing devices;
    a comparing unit configured to compare characteristics for each of the plurality of other image printing devices and said image printing device;
    a selection unit, provided in each image printing device, configured to select a managing image printing device to manage said plurality of image printing devices based on a result of a comparison between the characteristics for each of the plurality of other image printing devices, said image printing device, wherein said characteristics include one or more of central processing unit performance, memory size, or average load, wherein said managing image printing device is selected by said selection unit out of a group including said plurality of image printing devices, which includes image printing devices other than said image printing;
    a setting unit configured a default URL for said web server to correspond to a web server of the managing image printing device selected by the selection unit, wherein default URLs of web servers in the plurality of other image printing devices are also set to correspond to the web server of the managing image printing device;

a checking unit configured to check if another image printing device is managing the plurality of other image printing devices and said image printing device; and a disabling unit configured to disable the management unit when the another image printing device is managing the plurality of other image printing devices and said image printing device.

7. The system of claim 6, wherein each image printing device further comprises:

an enabling unit configured to enable said management unit.

8. The system of claim 6, wherein said management unit comprises:

a requesting unit configured to request and receive information from said plurality of image printing devices.

9. The system of claim 6, wherein said management unit comprises:

a receiving unit configured to receive instructions from a user station connected to said network;

a requesting unit configured to request and receive information from said plurality of image printing devices;

a configuration setting unit configured to set configurations for said plurality of image printing devices; and a transmitting unit configured to transmit information to said user station.

10. The system of claim 6, wherein at least one image printing device of said plurality of image printing devices is a printer, a multi-function peripheral, a digital copier, a fax machine, a copy machine, or a combination thereof.

11. A method for managing a plurality of image printing devices connected to a network, comprising the steps of:

comparing, at an image printing device of said plurality of image printing devices, characteristics for each of the plurality of image printing devices and the image printing device;

using the image printing device of said plurality of image printing devices to select a managing image printing device to manage said plurality of image printing devices based on a result of a comparison of the characteristics for each of the plurality of other image printing devices and said image printing device, wherein said characteristics include one or more of central processing unit performance, memory size, or average load;

managing said plurality of image printing devices from said managing image printing device, said managing image printing device including a web server configured to be a centralized management server for the network;

setting default URLs of web servers for said image printing devices to correspond to the web server for said managing image printing device, wherein said managing image printing device is selected out of a group including said plurality of image printing devices, which includes image printing devices other than said image printing device used to select said managing image printing device;

checking, at said managing image printing device, if another image printing device is selected to manage the plurality of other image printing devices and said image printing device; and disabling, at said managing image printing device, a management function of said managing image printing device when the another image printing device is functioning as a centralized management device.

12. The method of claim 11, wherein the step of managing from said managing image printing device comprises the step of:

receiving instructions from a user station connected to said network.

13. The method of claim 11, wherein the step of managing from said managing image printing device comprises the step of:

requesting and receiving information from said plurality of image printing devices.

14. The method of claim 11, wherein the step of managing from said managing image printing device comprises the steps of:

receiving instructions from a user station connected to said network;

requesting and receiving information from said plurality of image printing devices;

setting configurations for said plurality of image printing devices; and sending information to said user station.

15. The method of claim 11, further comprising the step of printing.

16. The method of claim 11, wherein said one image printing device is a printer, a multi-function peripheral, a digital copier, a fax machine, a copy machine, or a combination thereof.

17. A computer program product, comprising:

a computer storage medium and a computer program code mechanism embedded in the computer storage medium for causing an image printing device to manage a plurality of image printing devices connected to a network, the computer program code mechanism comprising:

a first computer code device configured to manage said plurality of image printing devices from a managing image printing device that includes a web server which can be a centralized management server for the network in an event that the image printing device is selected as a centralized management device;

a second computer code device configured to compare characteristics for each of the plurality of other image printing devices and said image printing device;

a third computer code device configured to select said managing image printing device to manage said plurality of image printing devices based on a result of the comparing of the characteristics for each of the plurality of other image printing devices and said image printing device, wherein said characteristics include one or more of central processing unit performance, memory size, or average load;

a fourth computer code device configured set default URLs of web servers for said image printing devices to correspond to the web server for said managing image printing device, wherein said managing image printing device is selected out of a group including said plurality of image printing devices, which includes image printing devices other than said image printing device used to select said managing image printing device;

a fifth computer code device configured to check if another image printing device is managing the plurality of other image printing devices and said image printing device; and a sixth computer code device configured to disable a management function of the managing image printing device when the another image printing device is managing the plurality of other image printing devices.

18. The computer program product of claim 17, further comprising:

a seventh computer code device configured to enable said first computer code device.

19. The computer program product of claim 17, further comprising:
a seventh computer code device configured to disable said first computer code device.

20. The computer program product of claim 17, wherein said first computer code device comprises:
a seventh computer code device configured to receive instructions from a user station connected to said network.

21. The computer program product of claim 17, wherein said first computer code device comprises:
a seventh computer code device configured to request and receive information from said plurality of image printing devices.

22. The computer program product of claim 17, wherein said first computer code device comprises:
a seventh computer code device configured to receive instructions from a user station connect to said network;
an eighth computer code device configured to request and receive information from said plurality of image printing devices;
a ninth computer code device configured to set configurations for said plurality of image printing devices; and
an tenth computer code device configured to send information to said user station.

23. The computer program product of claim 17, wherein said one image printing device is a printer, a multi-function peripheral, a digital copier, a fax machine, a copy machine, or a combination thereof.

* * * * *